United States Patent
Herz

(10) Patent No.: US 7,577,199 B1
(45) Date of Patent: Aug. 18, 2009

(54) APPARATUS AND METHOD FOR PERFORMING SURVEILLANCE USING MOTION VECTORS

(75) Inventor: William Samuel Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 892 days.

(21) Appl. No.: 10/665,895

(22) Filed: Sep. 18, 2003

Related U.S. Application Data

(63) Continuation-in-part of application No. 10/465,361, filed on Jun. 19, 2003.

(51) Int. Cl.
*H04N 7/12* (2006.01)
*H04N 7/18* (2006.01)

(52) U.S. Cl. .................. 375/240.16; 348/143
(58) Field of Classification Search ............... 348/155, 348/143, 144, 152, 153, 139–140; 386/46; 375/240.16
See application file for complete search history.

(56) References Cited

U.S. PATENT DOCUMENTS

| | | | |
|---|---|---|---|
| 5,588,067 A | 12/1996 | Peterson et al. | |
| 5,996,023 A | 11/1999 | Winter et al. | |
| 6,041,361 A | 3/2000 | Wilson et al. | |
| 6,107,918 A | 8/2000 | Klein et al. | |
| 6,169,573 B1 * | 1/2001 | Sampath-Kumar et al. | 348/169 |
| 6,359,560 B1 | 3/2002 | Budge et al. | |
| 6,421,080 B1 * | 7/2002 | Lambert | 348/143 |
| 6,434,320 B1 | 8/2002 | Orth et al. | |
| 6,480,225 B1 | 11/2002 | Kim | |
| 6,512,537 B1 | 1/2003 | Shimizu et al. | |
| 6,646,676 B1 * | 11/2003 | DaGraca et al. | 348/155 |
| 2003/0085998 A1 * | 5/2003 | Ramirez-Diaz et al. | 348/143 |
| 2004/0052501 A1 * | 3/2004 | Tam | 386/46 |
| 2004/0258152 A1 | 12/2004 | Herz | |
| 2005/0036659 A1 * | 2/2005 | Talmon et al. | 382/103 |

OTHER PUBLICATIONS

International Organization for Standardisation ISO/IEC JTC1/SC29/WG11 Coding of Moving Pictures and Audio—N4668, *Overview of the MPEG-4 Standard*, Mar. 2002, pp. 1-78 at http://mpeg.telecomitalialab.com/standards/mpeg-4/mpeg-4.htm.

(Continued)

*Primary Examiner*—Gims S Philippe
(74) *Attorney, Agent, or Firm*—Cooley Godward Kronish LLP

(57) ABSTRACT

A digital video recorder is described. In one embodiment, the digital video recorder includes an event detector configured to define a target region included in a set of video frames. The event detector is configured to detect movement of an object represented in the target region based on a motion vector associated with the object. The digital video recorder also includes an event recorder coupled to the event detector. The event recorder is configured to coordinate storage of at least a portion of the set of video frames in response to the detected movement. The digital video recorder further includes an event notifier coupled to the event detector. The event notifier is configured to generate an event notification in response to the detected movement.

9 Claims, 3 Drawing Sheets

OTHER PUBLICATIONS

D-Link, Building Networks for People, Home Security Enhanced 2.4GHz (802.11b) Wireless Internet Camera, DCS-2100+, 2 pages at http://www.dlink.com/products/category.asp?cid=60, Date Printed: May 17, 2004.

D-Link, Building Networks for People, Air Wireless 2.4GHz (802.11b) Internet Camera, DCS-1000W, 2 pages at http://www.dlink.com/products/category.asp?cid=60, Date Printed: May 17, 2004.

D-Link, Building Networks for People, Securicam Network Wireless 2.4GHz (802.11b) Internet Camera, DCS-900W, 2 page at http://www.dlink.com/products/category.asp?cid=60, Date Printed: May 17, 2004.

D-Link, Building Networks for People, Home Security Internet Camera, DCS-2000, 2 pages at http://www.dlink.com/products/category.asp?cid=60, Date Printed: May 17, 2004.

D-Link, Building Networks for People, Express EtherNetwork Internet Camera, DCS-1000, 2 pages at http://www.dlink.com/products/category.asp?cid=60, Date Printed: May 17, 2004.

D-Link, Building Networks for People, Securicam Network Internet Camera, DCS-900, 2 pages at http://www.dlink.com/products/category.asp?cid=60, Date Printed: May 17, 2004.

D-Link, Building Networks for People, Securicam Network, Enhanced Wireless 2.4GHz (802.11b) Internet Camera, DCS-5300W, 2 pages at http://www.dlink.com/products/category.asp?cid=60, Date Printed: May 17, 2004.

D-Link, Building Networks for People, Securicam Network Internet Camera, DCS-5300, 2 pages at http://www.dlink.com/products/category.asp?cid=60, Date Printed: May 17, 2004.

* cited by examiner

APPARATUS AND METHOD FOR PERFORMING SURVEILLANCE USING MOTION VECTORS

CROSS REFERENCE TO RELATED APPLICATION

This application is a continuation-in-part of U.S. patent application Ser. No. 10/465,361, filed on Jun. 19, 2003 and entitled "System and Method for Using Motion Vectors for Object Tracking", the disclosure of which is incorporated herein by reference in its entirety.

BRIEF DESCRIPTION OF THE INVENTION

The invention relates generally to performing surveillance. More particularly, the invention relates to performing surveillance using motion vectors.

BACKGROUND OF THE INVENTION

A digital video recorder can record television programs for subsequent viewing by a user. Existing digital video recorders allow a user to overcome the rigid time schedule according to which television programs are typically broadcast. For example, an existing digital video recorder can be programmed to record a television program to allow viewing at a time that is more convenient for a user. In addition, existing digital video recorders often include a number of features that further enhance viewer experience. For example, certain digital video recorders include circular buffers or time-shift buffers that allow a user viewing a "live" broadcast of a television program to pause viewing at a certain point and, at a later time, resume viewing from that point.

When a user is not using an existing digital video recorder, the digital video recorder often is simply switched off or operates in an idle or stand-by mode. It would be desirable for a digital video recorder to perform certain tasks during a time interval when a user is away from the digital video recorder or away from home. In particular, it would be desirable to exploit video processing capabilities of the digital video recorder to perform video surveillance during such time interval.

It is against this background that a need arose to develop the apparatus and method described herein.

SUMMARY OF THE INVENTION

In one innovative aspect, the invention relates to a digital video recorder. In one embodiment, the digital video recorder includes an event detector configured to define a target region included in a set of video frames. The event detector is configured to detect movement of an object represented in the target region based on a motion vector associated with the object. The digital video recorder also includes an event recorder coupled to the event detector. The event recorder is configured to coordinate storage of at least a portion of the set of video frames in response to the detected movement. The digital video recorder further includes an event notifier coupled to the event detector. The event notifier is configured to generate an event notification in response to the detected movement.

In another innovative aspect, the invention relates to a computer-readable medium. In one embodiment, the computer-readable medium includes instructions to identify an object represented in a target region as included in a first video frame. The computer-readable medium also includes instructions to detect movement of the object based on a motion vector associated with the object. The computer-readable medium further includes instructions to shift the target region as included in a second video frame in response to the detected movement and instructions to coordinate storage of portions of the first and second video frames corresponding to the target region.

In a further innovative aspect, the invention relates to a method of operating a digital video recorder. In one embodiment, the method includes identifying a motion vector associated with an object based on video data representing a sequence of images of the object. The method also includes detecting movement of the object based on the motion vector. The method further includes generating an event notification in response to the detected movement. The event notification includes the video data.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
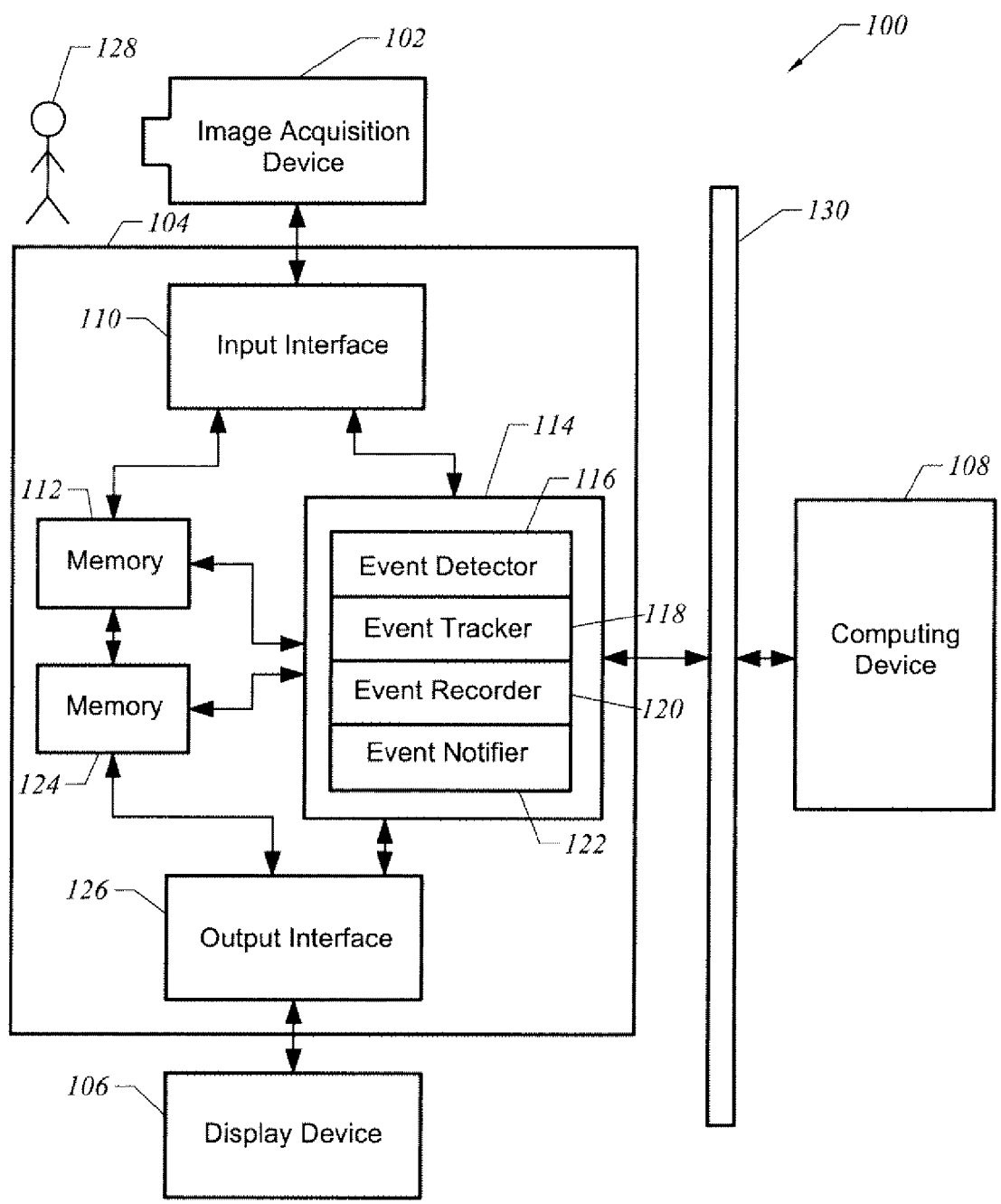
FIG. 1 illustrates a surveillance system that can be operated in accordance with an embodiment of the invention.

FIG. 1 illustrates a surveillance system 100 that can be operated in accordance with an embodiment of the invention. The surveillance system 100 includes an image acquisition device 102, a digital video recorder 104, a display device 106, and a computing device 108. The digital video recorder 104 is connected to a network 130 using any wire or wireless transmission channel. Similarly, the computing device 108 is connected to the network 130 using any wire or wireless transmission channel.

In the illustrated embodiment, the digital video recorder 104 can perform conventional digital video recorder operations, such as, for example, recording television programs for subsequent viewing by a user. Advantageously, the digital video recorder 104 can also perform surveillance operations as discussed below.

As illustrated in FIG. 1, the digital video recorder 104 includes an input interface 110, which is coupled to the image acquisition device 102. The input interface 110 receives video data captured by the image acquisition device 102, which can include, for example, a conventional video camera. The video data can include multiple video frames, which can represent a sequence of images in a field of view of the image acquisition device 102. As illustrated in FIG. 1, an object 128 is disposed in the field of view of the image acquisition device 102. Depending on the format of the video data, the input interface 110 can perform a number of signal processing operations to convert the video data into a format suitable for further processing by the digital video recorder 104. In the illustrated embodiment, the input interface 110 encodes the video data using any of a number of conventional compression techniques to reduce memory requirements for storing operations. For example, the input interface 110 can encode the video data using Moving Pictures Experts Group ("MPEG") compression techniques. In connection with encoding the video data, the input interface 110 generates motion vectors associated with the object 128. As one of ordinary skill in the art will understand, a motion vector can indicate a distance and a direction of movement of an object between video frames. It is also contemplated that the image acquisition device 102 can generate such motion vectors.

As illustrated in FIG. 1, the digital video recorder 104 includes a memory 112, which is coupled to the input interface 110. The input interface 110 provides the encoded video data to the memory 112, which stores the encoded video data. In the illustrated embodiment, the memory 112 can be implemented as a circular buffer to provide temporary storage of the encoded video data. The memory 112 can include, for example, a hard disk drive or an optical storage medium.

Referring to FIG. 1, the digital video recorder 104 includes a surveillance unit 114, which is coupled to the input interface 110, the memory 112, as well as a memory 124. The surveillance unit 114 performs surveillance operations during a time interval when a user is away from the digital video recorder 104 or during any other time interval. In the illustrated embodiment, the surveillance unit 114 includes an event detector 116, an event tracker 118, an event recorder 120, and an event notifier 122.

The event detector 116 operates to detect a triggering event, which can correspond to any condition to be monitored during surveillance operations of the digital video recorder 104. In the illustrated embodiment, the event detector 116 operates as a motion detector by detecting movement of the object 128. In particular, the event detector 116 identifies motion vectors generated by the input interface 110. The identification of motion vectors can indicate that the image acquisition device 102 is capturing images of the object 128 as it moves in the field of view of the image acquisition device 102. Upon detecting movement of the object 128, the event detector 116 generates an indication of the detected movement to direct further operations of the surveillance unit 114. In particular, the event detector 116 provides this indication to the event tracker 118, the event recorder 120, and the event notifier 122, which are coupled to the event detector 116.

The event tracker 118 operates to track the triggering event in response to its detection by the event detector 116. In the illustrated embodiment, the event tracker 118 operates as an object tracker by tracking the object 128 for which movement is detected by the event detector 116. The event tracker 118 can track the object 128 substantially on-the-fly, such as, for example, as a sequence of images of the object 128 captured by the image acquisition device 102, or subsequently, such as, for example, during storing operations or playback. In some instances, the event tracker 118 can "physically" track the object 128 by generating control signals to reposition the image acquisition device 102, such that the object 128 substantially remains in the field of view of the image acquisition device 102. Alternatively, or in conjunction, the event tracker 118 can "virtually" track the object 128 by tracking images of the object 128 between video frames.

The event recorder 120 operates to record the triggering event in response to its detection by the event detector 116. In the illustrated embodiment, the event recorder 120 coordinates storage of a sequence of images of the object 128 for which movement is detected by the event detector 116. In particular, in response to the detected movement, the event recorder 120 transfers at least a portion of the stored video data from the memory 112 to the memory 124, which stores the transferred video data. In some instances, the transferred video data can represent a sequence of images of the object 128 as tracked by the event tracker 118. In the illustrated embodiment, the memory 124 can be implemented as a hard disk drive to provide long-term storage or archiving of the transferred video data. By archiving video data upon detection of movement, the illustrated embodiment promotes efficient use of the memory 124 by reducing the likelihood of archiving large amounts of uninteresting video data. At the same time, the likelihood that images of the object 128 is properly archived in the memory 124 is increased.

The event notifier 122 operates to alert a user of the triggering event in response to its detection by the event detector 116. In the illustrated embodiment, the event notifier 122 generates an event notification in response to the detected movement of the object 128. The event notification can serve as an indication of an alarm condition. As illustrated in FIG. 1, the event notification can be transmitted via the network 130 to the computing device 108, which can include, for example, a client computer, a server computer, or a portable device such as a handheld computer, a mobile phone, or a pager. In some instances, the event notification can include video data representing a sequence of images of the object 128 as tracked by the event tracker 118. Depending on the format of the video data to be transmitted, the event notifier 122 can perform a number of signal processing operations to convert the video data into a format suitable for transmission via the network 130. Typically, the video data in its original format can remain archived in the memory 124. It is also contemplated that the event notification can be shown to a user using the display device 106.

As illustrated in FIG. 1, the digital video recorder 104 includes an output interface 126, which is coupled to the memory 124, the surveillance unit 114, and the display device 106. During playback, the output interface 126 receives the stored video data from the memory 124, which stored video data represents a sequence of images of the object 128. Depending on the format of the stored video data, the output interface 126 can perform a number of signal processing operations to convert the stored video data into a format suitable for display by the display device 106. In the illustrated embodiment, the output interface 126 receives the encoded video data stored in the memory 124 and transcodes the encoded video data using any of a number of conventional transcoding techniques, such as, for example, MPEG decompression techniques.

The foregoing discussion provides a general overview of an embodiment of the invention. Attention now turns to FIG. 2, which illustrates a flow chart for operating a digital video recorder (e.g., the digital video recorder 104) in accordance with an embodiment of the invention.

Figure 2:
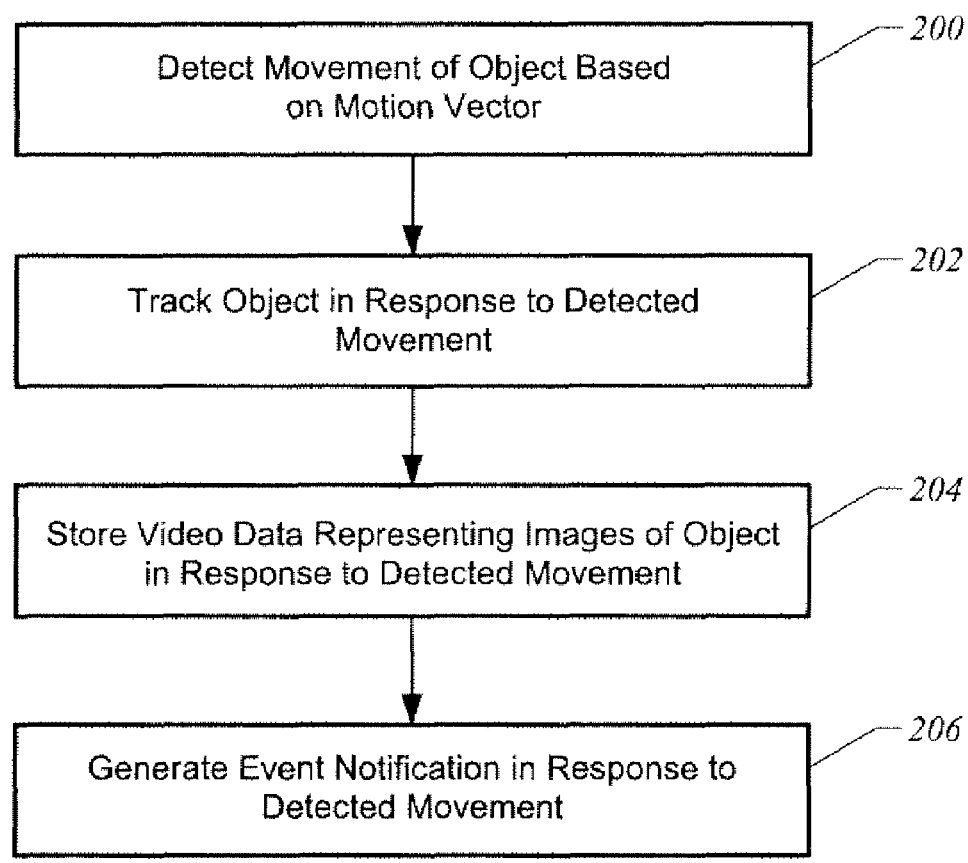
FIG. 2 illustrates a flow chart for operating a digital video recorder in accordance with an embodiment of the invention.

The first operation illustrated in FIG. 2 is to detect movement of an object based on a motion vector associated with the object (block 200). In the illustrated embodiment, an event detector (e.g., the event detector 116) defines a target region included in a set of video frames and detects movement of the object represented in the target region.

Figure 3:
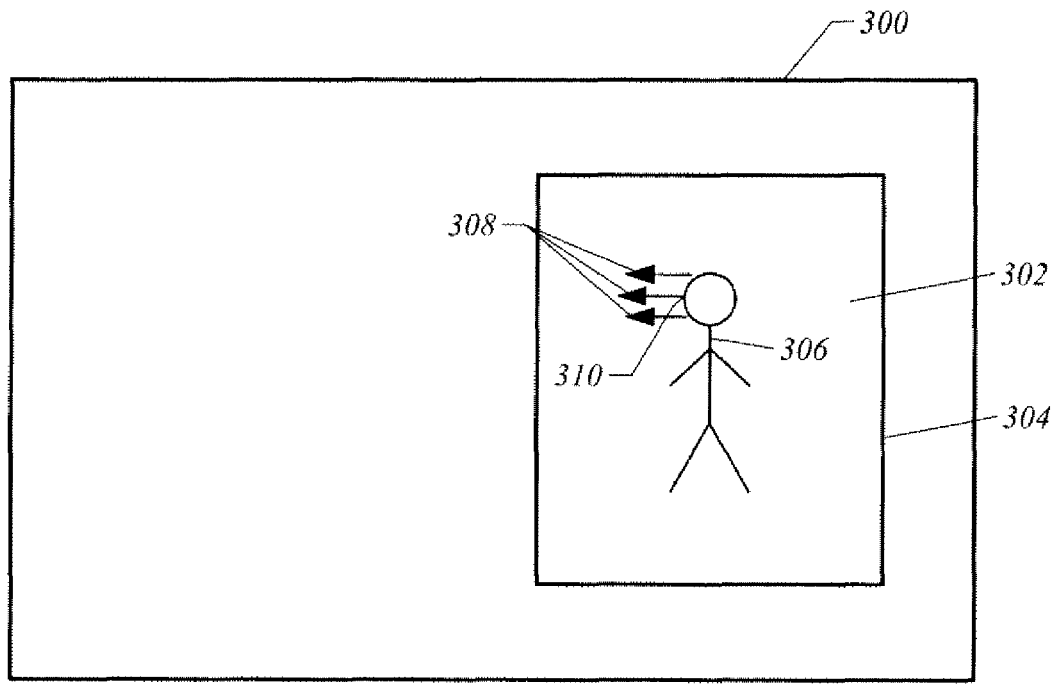
FIG. 3 illustrates an example of a video frame in which a target region is defined.

FIG. 3 illustrates an example of a video frame 300 in which a target region 302 is defined. As illustrated in FIG. 3, the target region 302 corresponds to a portion of the video frame 300 defined by a rectangular boundary 304, and an object 306 is represented within the rectangular boundary 304. A user, the event detector, or a combination of the user and the event detector can select the target region 302. For example, the user can select the target region 302 using a mouse or any other input device. It is also contemplated that the event detector can automatically select the target region 302 based on a triggering event, such as, for example, movement of the object 306 between video frames. For example, when the object 306 changes its position from one video frame to another, the event detector can automatically select the portion of the video frame 300 that includes the image of the object 306 as the target region 302.

In the illustrated example, the target region 302 can represent an area to be monitored with greater attention, such as, for example, an area in the vicinity of a door, a drawer, a window, or a cash register. Thus, defining the target region 302 allows movement in an area of interest to be monitored, while movement in remaining areas can be ignored. The target region 302 can represent a foreground or a background of an area to be monitored. Accordingly, the event detector can detect movement of the object 306 in the foreground, while movement in a background scenery can be ignored. Such configuration is useful, for example, when monitoring an area in the vicinity of a door of a home. In this case, background movement, such as movement of a car on a street, can be ignored, while foreground movement, such as movement of an individual approaching the door, can be processed.

Returning to block 200 of FIG. 2, once the target region is defined, the event detector detects movement of the object represented in the target region. In the illustrated embodiment, the event detector identifies the object represented in the target region using any of a number of conventional object identification techniques. For example, the event detector can identify a set of pixels that correspond to a portion of an edge or perimeter of the object or any other reference point of the object. In some instances, the event detector can identify the presence of the object based on determining if a reference point of the object falls within or crosses a boundary of the target region. Once the object is identified, motion vectors associated with the object are identified. For example, the event detector can identify a set of pixels that correspond to a portion of an edge of the object and can then identify motion vectors that are associated with the set of pixels.

In the illustrated embodiment, the event detector detects movement of the object based on magnitudes of the motion vectors, orientations of the motion vectors, or a combination of the magnitudes and orientations of the motion vectors. For example, the event detector can detect movement of the object if the magnitudes of the motion vectors are greater than or equal to a threshold value. Alternatively, or in conjunction, the event detector can detect movement of the object if the orientations of the motion vectors are substantially non-random or aligned with respect to a particular direction. Advantageously, such configuration allows the event detector to determine whether the object is moving along a particular direction, such as, for example, towards an area to be monitored with greater attention. A user, the event detector, or a combination of the user and the event detector can select a threshold value or a particular direction of movement. For example, the user can select the threshold value to prevent or reduce false alarms.

Referring to FIG. 3, various motion vectors 308 associated with the object 306 are illustrated. It should be recognized that the motion vectors 308 are provided for illustration purposes, as the motion vectors 308 typically are not visible. In the illustrated example, the motion vectors 308 indicate a distance and a direction of movement of the object 306 between video frames. In particular, the motion vectors 308 indicate movement of an edge 310 of the object 306 and can be used to predict movement of the entire object 306. As illustrated in FIG. 3, the motion vectors 308 indicate that the edge 310 of the object 306 is moving from right to left.

The second operation illustrated in FIG. 2 is to track the object in response to the detected movement (block 202). In the illustrated embodiment, an event tracker (e.g., the event tracker 118) tracks the object by shifting the target region included in the set of video frames.

Figure 4:
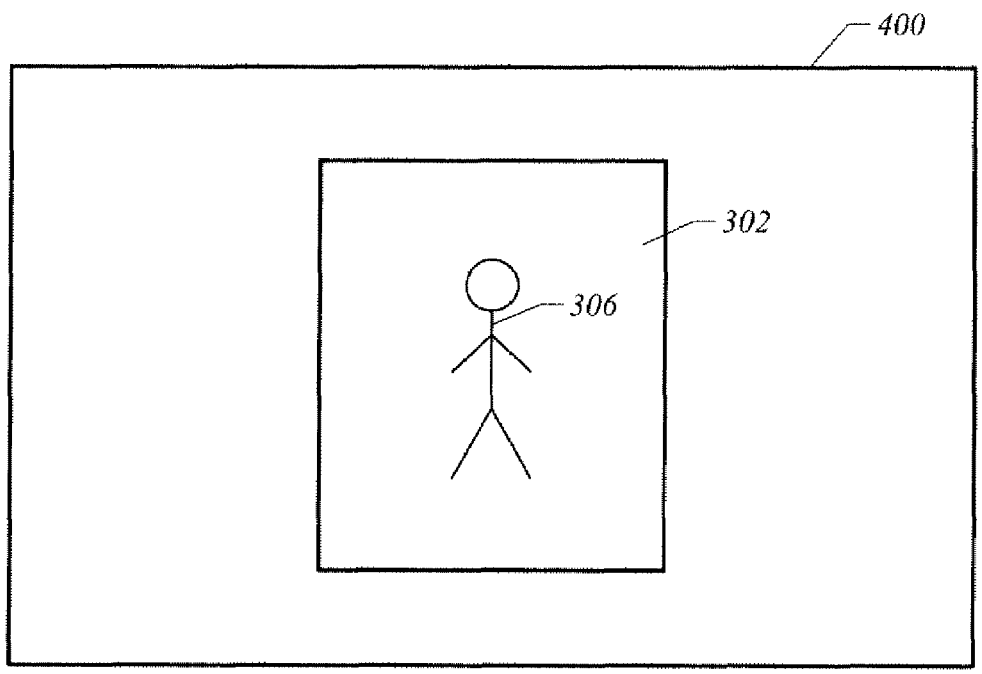
FIG. 4 illustrates an example of a video frame in which the target region has been shifted relative to its previous position shown in FIG. 3.

FIG. 4 illustrates an example of a video frame 400 in which the target region 302 has been shifted relative to its previous position shown in FIG. 3. Based on the detected movement of the object 306, the event tracker shifts the target region 302 to match the detected movement. Thus, in the illustrated example, as the object 306 moves from left to right, the event tracker shifts the target region 302 from left to right. The event tracker can shift the target region 302 to keep the target region 302 substantially centered with respect to the object 306, such as, for example, centered with respect to a particular reference point of the object 306.

As discussed previously, the event tracker can also track the object 306 by generating control signals to reposition an image acquisition device (e.g., the image acquisition device 102). In particular, the image acquisition device can be repositioned to match the detected movement of the object 306. Thus, for example, the event tracker can reposition the image acquisition device, such that the target region 302 remains substantially centered with respect to the object 306. In some instances, the target region 302 can substantially remain stationary with respect to various video frames as the image acquisition device is repositioned to track the object 306.

The third operation illustrated in FIG. 2 is to store video data representing images of the object in response to the detected movement (block 204). In the illustrated embodiment, an event recorder (e.g., the event recorder 120) coordinates storage of a sequence of images of the object in response to the detected movement. Video data captured by the image acquisition device is initially stored in a memory (e.g., the memory 112), which can be implemented as a circular buffer to provide temporary storage of the video data. In response to the detected movement, the event recorder transfers at least a portion of the stored video data to another memory (e.g., the memory 124), which can be implemented as a hard disk drive to provide long-term storage or archiving of the transferred video data. It is also contemplated that the event recorder can transfer video data from one portion of a memory to another portion of the memory. It is further contemplated that the event recorder can directly store video data in a memory (e.g., the memory 124) in response to the detected movement.

In the illustrated embodiment, the transferred video data can be associated with a time interval subsequent to detection of movement of the object. This time interval can start when movement of the object is detected and can end when movement of the object is no longer detected. In some instances, a time interval prior to detection of movement can also be of interest. Such time interval can be useful to provide a complete record of a triggering event by including images of the object prior to its movement being detected. Accordingly, through use of the circular buffer, the event recorder can also transfer video data associated with a time interval prior to detection of movement of the object, which time interval can be a pre-defined time interval, such as, for example, one or more seconds. For similar reasons, through use of the circular buffer, the event recorder can also transfer video data associated with a time interval when movement is no longer detected, which time interval can be a pre-defined time interval, such as, for example, one or more seconds. It is contemplated that metadata and audio data associated with the transferred video data can also be archived in the memory 124. For example, the event recorder can generate a time stamp or other indication to mark a time interval associated with the transferred video data. Other examples of metadata include indications of a date, a location, and the image acquisition device. Also, to provide a complete record of the triggering event, the event recorder can coordinate storage of audio data associated with the transferred video data. The audio data can be captured by a sound acquisition device, which can include, for example, a conventional microphone. In some instances, the event recorder can authenticate the transferred video data using any of a number of conventional authentication techniques, such as, for example, conventional encryption techniques.

To promote efficient use of a limited memory capacity, the event recorder can transfer portions of stored video frames corresponding to the target portion, while remaining portions of the stored video frames need not be transferred. Thus, for example, the event recorder can transfer a sequence of images of the object in the vicinity of a door, while remaining images of a background scenery can be discarded. Transferred video data can represent a sequence of images of the object as tracked by the event tracker. For example, the event recorder can transfer a sequence of images of the object as included in the target region, which target region is shifted to match the detected movement of the object.

The fourth operation shown in FIG. 2 is to generate an event notification in response to the detected movement (block 206). In the illustrated embodiment, an event notifier (e.g., the event notifier 122) generates the event notification, which can serve as an indication of an alarm condition to alert a user. The event notification can take a number of forms, such as, for example, an alarm sound, an e-mail message, a paging message, and a telephone call. Thus, for example, the event notifier can transmit the event notification via a network (e.g., the network 130) to a computing device (e.g., the computing device 108). In some instances, the event notification can include video data representing one or more images of the object. Accordingly, a user at a remote location can be alerted of the triggering event and can view one or more images of the object transmitted via the network. Depending on the available bandwidth of the network, the event notification can include the video data in the form of a single video frame or multiple video frames. As discussed previously, the event notifier can perform a number of signal processing operations to convert the video data into a format suitable for transmission via the network. For example, the event notifier can encode the video data using any of a number of conventional transcoding techniques.

It is contemplated that the user can remotely direct various operations of the digital video recorder upon being alerted of the triggering event. It is also contemplated that the event notification can include metadata and audio data associated with the transmitted video data. For example, the event notifier can generate a time stamp or other indication to mark a time interval associated with the transmitted video data. Other examples of metadata include indications of a date, a location, and the image acquisition device. In some instances, the computing device can receive the transmitted video data and can generate a time stamp as well as authenticate the transmitted video data using any of a number of conventional authentication techniques.

To promote efficient use of a limited bandwidth, the event notifier can transmit portions of video frames corresponding to the target portion, while remaining portions of the video frames need not be transmitted. Transmitted video data can represent a sequence of images of the object as tracked by the event tracker. Thus, for example, the event notifier can transmit a sequence of images of the object as included in the target region, which target region is shifted to match the detected movement of the object.

It should be recognized that the specific embodiments of the invention discussed above are provided by way of example, and various other embodiments are encompassed by the invention. For example, referring to FIG. 1, it is contemplated that the surveillance unit 114 can detect various types of triggering events and can perform a number of operations in response to detecting a particular triggering event. For some embodiments of the invention, the event detector 116 can recognize various types of movement of the object 128 based on motion vectors associated with the object 128. For example, the event detector 116 can recognize various types of movement associated with different gestures, such as, for example, arm waving or hand signals, and can detect a triggering event for one or more of these types of movement. For other embodiments of the invention, the event detector 116 can also operate as an audio detector by detecting audio stimuli. In particular, the event detector 116 can be coupled to a sound acquisition device, which can include, for example, a conventional microphone. Upon detecting the audio stimuli, the event detector 116 can generate an indication of the detected audio stimuli to direct further operations of the surveillance unit 114 in a similar fashion as discussed previously. For example, in response to the detected audio stimuli, the event tracker 118 can operate as an object tracker by tracking an object associated with the audio stimuli, the event recorder 120 can coordinate storage of audio data associated with the audio stimuli, and the event notifier 122 can generate an event notification as an indication of an alarm condition. In some instances, the event detector 116 can detect a triggering event based on a combination of detected audio stimuli and detected movement. It is contemplated that such embodiments of the invention can be advantageously used as an infant monitor.

An embodiment of the invention relates to a computer storage product with a computer-readable medium having computer instructions or code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD/DVDs, CD-ROMs, and holographic devices; magneto-optical media such as floptical disks; carrier wave signals; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Additional examples of computer code include encrypted code and compressed code.

Another embodiment of the invention may be implemented using computer code in place of, or in combination with, hardwired circuitry. With reference to FIG. 1, various components of the digital video recorder 104 can be implemented using computer code, hardwired circuitry, or a combination thereof. Thus, for certain applications, various components of the digital video recorder 104 can be implemented using computer code to direct operations of a computer. The computer can be any conventional computer and, in some instances, can include a Graphics Processing Unit ("GPU"), such as, for example, one provided by NVIDIA® Corporation, located in Santa Clara, Calif. The surveillance unit 114 can be implemented in a number of ways. For example, the surveillance unit 114 can include a control circuit, such as, for example, a microprocessor, a GPU, or a central processing unit, operative to execute a set of instructions stored in an associated memory. For such configuration, the event detector 116, the event tracker 118, the event recorder 120, and the event notifier 122 can be implemented as instructions stored in the memory. For other applications, the surveillance unit 114 can be implemented using ASICs, PLDs, or both.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the invention. Accordingly, unless specifically indicated herein, the order and grouping of the steps is not a limitation of the invention.

What is claimed is:

1. A digital video recorder, comprising:
   a first memory configured to store a plurality of video frames captured by an image acquisition device;
   a second memory coupled to said first memory; and
   a surveillance unit coupled to said first memory and said second memory, said surveillance unit including
      an event detector configured to define a target region included as a portion in each of said plurality of video frames, said target region representing a specific area to be monitored for movement, said event detector being configured to detect movement of an object represented in said target region based on a motion vector associated with said object;
      an event tracker coupled to said event detector, said event tracker being configured to shift, in response to said detected movement, said target region as included in said plurality of video frames, said target region being shifted such that said target region is substantially centered with respect to said object, said target region being shifted without repositioning said image acquisition device and without activating another image acquisition device;
      an event recorder coupled to said event detector, said event recorder being configured to coordinate selective storage of said portions of said plurality of video frames corresponding to said target region, said event recorder being configured to transfer said portions of said plurality video frames from said first memory to said second memory in response to said detected movement; and
      an event notifier coupled to said event detector, said event notifier being configured to generate an event notification in response to said detected movement.

2. The digital video recorder of claim 1, wherein said event detector is configured to detect movement of said object based on identifying a reference point of said object, said motion vector being associated with said reference point.

3. The digital video recorder of claim 2, wherein said reference point corresponds to a portion of a perimeter of said object.

4. The digital video recorder of claim 1, wherein said event detector is configured to detect movement of said object based on at least one of a magnitude and an orientation of said motion vector.

5. The digital video recorder of claim 1, wherein said event recorder is configured to coordinate storage of said portions of said plurality of video frames in the absence of remaining portions of said plurality of video frames.

6. The digital video recorder of claim 1, wherein said event recorder is configured to coordinate storage of audio data in response to said detected movement.

7. The digital video recorder of claim 1, wherein said first memory is configured as a circular buffer to temporarily store said plurality of video frames.

8. The digital video recorder of claim 1, wherein said event tracker is configured to shift said target region to substantially match said detected movement of said object.

9. The digital video recorder of claim 1, wherein said event notifier is configured to transmit said event notification via a network, said event notification including said portions of said plurality of video frames corresponding to said target region.

* * * * *